US006895368B2

United States Patent
Murakami

(10) Patent No.: US 6,895,368 B2
(45) Date of Patent: May 17, 2005

(54) MAINTENANCE INFORMATION SUPPLY SYSTEM WITH A HOST COMPUTER AND AN ELECTRONIC DEVICE

(75) Inventor: Koichiro Murakami, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/310,502

(22) Filed: Dec. 5, 2002

(65) Prior Publication Data

US 2003/0110013 A1 Jun. 12, 2003

(51) Int. Cl.⁷ ............................................... G06F 11/00
(52) U.S. Cl. .................... 702/188; 702/188; 702/184; 702/116; 702/104; 707/104.1; 707/200; 340/500; 340/602; 348/143
(58) Field of Search .............................. 702/104, 116, 702/182–184, 188; 707/200, 203, 104.1; 340/500, 602; 348/143

(56) References Cited

U.S. PATENT DOCUMENTS

| 5,950,148 A | * | 9/1999 | Nakagawa et al. | .......... 702/182 |
| 5,988,862 A | * | 11/1999 | Kacyra et al. | .................. 703/6 |
| 2002/0045976 A1 | * | 4/2002 | Kodama | ....................... 701/29 |
| 2003/0004680 A1 | * | 1/2003 | Dara-Abrams et al. | ..... 702/183 |
| 2003/0061005 A1 | * | 3/2003 | Manegold et al. | ........... 702/182 |
| 2003/0101025 A1 | * | 5/2003 | Shah et al. | .................. 702/188 |

OTHER PUBLICATIONS

Nakashima et al., 'Application of Semi–Automatic Robot Technology on Hot–Line Maintenance Work', 1995, IEEE Publication, pp. 843–850.*

Widemann, 'Application Critical Parameters for Rubidium Standards', 1998, IEEE Publication, pp. 84–87.*

Pellegrino, 'Remote Visual Testing (RVT) Technology and Its Application to Power Plant Inspection and Maintenance Tasks', Jun. 1999, Everest VIT Inc., pp. 1–7.*

* cited by examiner

Primary Examiner—Marc S. Hoff
Assistant Examiner—Elias Desta
(74) Attorney, Agent, or Firm—Coheh, Pontani, Lieberman & Pavane

(57) ABSTRACT

A maintenance information supply system, including: a host terminal including a data base for storing information regarding a periodic inspection time or a part replace time for a predetermined electronic device terminal; and the electronic device terminal, provided with an information sending/receiving function for communicating with the host terminal. The electronic device terminal sends to the host terminal, device kind information and present position information or working environment information. The host terminal searches the information regarding the periodic inspection time of the electronic device terminal or a part replace time from the data base. The host terminal calculate maintenance information according to the present position information or working environment information, and a predetermined calculation table, so as to send the maintenance information to the electronic device terminal; and the electronic device terminal receives the maintenance information from the host terminal.

37 Claims, 8 Drawing Sheets

| WORKING ENVIRONMENT | CONSTANT |
|---|---|
| NORMAL | 1.00 |
| HUMIDITY NOT LOWER THAN 80 % | 1.25 |
| AIR TEMPERATURE NOT LOWER THAN 30°C | 1.10 |
| AIR TEMPERATURE NOT HIGHER THAN 0°C | 1.10 |
| NUMBER OF DUSTS PER UNIT VOLUME (1 cm$^3$) IS NOT SMALLER THAN 10 PCS. | 1.20 |
| INDOOR | 0.95 |
| AT THE TIME OF RAIN | 1.05 |
| DESERT AREA | 1.25 |
| COAST AREA | 1.20 |

MAINTENANCE INFORMATION SUPPLY SYSTEM WITH A HOST COMPUTER AND AN ELECTRONIC DEVICE

BACKGROUND OF THE INVENTION

The present invention relates to a maintenance information supply system to report its adequate inspection time and/or the part replace time, for example, to an electric device such as a digital camera, a host computer which is its component, and electronic device, and further, to an electronic device having therein a function to report its adequate inspection time and/or part replace time.

In the light of the recent enhancement of the interest to the environment issues, from the point of view of the waste discharge amount reduction, in the future, it is considered that the product life of each product is extended. Also in the electronic device, it is not an exception, and it is considered that the product life is further extended. Then, accompanied by the increase of the product life, it is important for prolonging the product life that the maintenance for the electronic device (periodic inspection, replacement of the consumed part) is adequately conducted. That is, for the electronic device manufacturer, it is required that the adequate and fine after-service is realized.

However, when considered the recommended display of the periodic inspection for the present electronic device, it is uniform and there is often a case where it does not always match the actual condition. For example, in a copier, every time when the number of copies reaches a predetermined value, there is a copier structured such that the recommended display of the periodic inspection is conducted, however, because the adequate inspection time changes due to the working environment in which the copier is installed, even when the periodic inspection time of all the copiers is determined according to the number of copies, it is never the situation that the maintenance is conducted at an adequate time.

Further, a situation that the maintenance is conducted before the adequate time, results in a case that the unnecessary maintenance is conducted for the copier, and a situation that the maintenance is conducted after the adequate time, results in a case that the product life of the copier is shortened.

SUMMARY OF THE INVENTION

In view of the above problems, the present invention is attained, and an aspect of the present invention is to provide a maintenance information supply system, host computer, and electronic device in which, in the light of the working environment in which the electronic device is placed, by calculating the adequate inspection time and/or part replace time, and reporting it to the user, it is avoided that unnecessary inspection is conducted, and the product life of the electronic device can be extended.

[Means for Solving the Problems]

In order to solve the above problems, the present invention is a maintenance information supply system, including: a host terminal including a data base for storing information regarding at least one of a periodic inspection time and a part replace time for a predetermined electronic device terminal of each kind; and the electronic device terminal, provided with an information sending/receiving function for sending and receiving the information between the electronic device terminal and the host terminal; in which the electronic device terminal sends to the host terminal, device kind information of the electronic device terminal and at least one of present position information and working environment information; the host terminal, according to the device kind information sent from the electronic terminal, searches the information regarding at least one of the periodic inspection time of the electronic device terminal and part replace time from the data base; the host terminal calculate maintenance information according to at least one of the present position information and working environment information, sent from the electronic device terminal, and a predetermined calculation table, so as to send the maintenance information, including at least one of an inspection time and a part replace time, to the electronic device terminal; and the electronic device terminal receives the maintenance information and displayed by the electronic device after the electronic device terminal receives the maintenance information sent from the host terminal.

In order to solve the above problems, the present invention is the maintenance information supply system in which the electronic device terminal comprises a position information detection function, having a GPS function, for obtaining the present position information.

In order to solve the above problems, the present invention is the maintenance information supply system in which the working environment information includes at least one of the pieces of information regarding temperature, humidity, and density of dust of a location at which the electronic device terminal is positioned.

In order to solve the above problems, the present invention is the maintenance information supply system in which the working environment information is obtained by each kind of sensors provided in the electronic device terminal.

In order to solve the above problems, the present invention is the maintenance information supply system in which the host terminal determines at least one of terrain and weather of a location, at which the electronic device terminal is positioned, from the present position information.

In order to solve the above problems, the present invention is the maintenance information supply system in which the host terminal judges the location, at which the electronic device terminal is positioned, as indoor when the present position information is not detected.

In order to solve the above problems, the present invention is the maintenance information supply system in which the predetermined calculation table including constants set corresponding to each of air temperature, humidity, density of dust, weather, terrain, and indoor/outdoor status.

In order to solve the above problems, the present invention is the maintenance information supply system in which the host terminal calculates at least one of an inspection time and a part replace time of the electronic device terminal by multiplying a working time of the electronic device terminal with the constant so as to obtain an adequate working time.

In order to solve the above problems, the present invention is the maintenance information supply system in which the host terminal calculates at least one of an inspection time and a part replace time of the electronic device terminal by multiplying a number of working times of the electronic device terminal with the constant so as to obtain an adequate number of working times.

In order to solve the above problems, the present invention is the maintenance information supply system in which the electronic device terminal is a digital still camera.

In order to solve the above problems, the present invention is a host computer, capable of communicating with a predetermined electronic device through a network including a telephone line, including: a data base for storing information regarding at least one of a periodic inspection time and a part replace time for a predetermined electronic device of each kind; in which the host computer searches the information regarding at least one of the periodic inspection time of the electronic device and the part replace time from the data base according to device kind information when the device kind information of the electronic device and at least one of present position information and working environment information is received from the electronic device through the network; the host computer calculate maintenance information, including at least one of an inspection time and a part replace time, according to at least one of the present position and working environment information, sent from the electronic device terminal, and a predetermined calculation table, so as to send the maintenance information to the electronic device.

In order to solve the above problems, the present invention is the host computer in which the host computer determines at least one of terrain and weather of a location, at which the electronic device is positioned, from the present position information.

In order to solve the above problems, the present invention is the host computer in which the host computer judges a location, at which the electronic device is positioned, as indoor when the present position information is not detected.

In order to solve the above problems, the present invention is the host computer in which the predetermined calculation table including constants set corresponding to each of air temperature, humidity, density of dust, weather, terrain, and indoor/outdoor status.

In order to solve the above problems, the present invention is the host computer in which the host computer calculates at least one of an inspection time and a part replace time of the electronic device by multiplying a working time of the electronic device with the constant so as to obtain an adequate working time.

In order to solve the above problems, the present invention is host computer in which the host computer calculates at least one of an inspection time and a part replace time of the electronic device by multiplying a number of working times of the electronic device with the constant so as to obtain an adequate number of working times.

In order to solve the above problems, the present invention is an electronic device, capable of communicating with an outside apparatus through a network including the telephone line, including: an information sending function for sending device kind information of the electronic device terminal and at least one of present position information and working environment information to the outside apparatus; an information receiving function for receiving maintenance information from the outside apparatus; and a display function for displaying the maintenance information received from the outside apparatus.

In order to solve the above problems, the present invention is the electronic device in which the electronic device comprises a position information detection function, having a GPS function, for obtaining the present position information.

In order to solve the above problems, the present invention is the electronic device in which the working environment information includes at least one of the pieces of information regarding temperature, humidity, and density of dust of a location at which the electronic device is positioned.

In order to solve the above problems, the present invention is the electronic device in which the working environment information is obtained by each kind of sensors provided in the electronic device.

In order to solve the above problems, the present invention is the electronic device in which the maintenance information includes at least one of an inspection time and a part replace time.

In order to solve the above problems, the present invention is the electronic device in which the electronic device is a digital still camera.

In order to solve the above problems, the present invention is an electronic device, including: a memory function for storing information regarding at least one of a periodic inspection time and a part replace time for the electronic device; a detecting function for detecting at least one of the present position information and working environment information; a control function for controlling the electronic device so as to calculate maintenance information according to at least one of the present position information and working environment information, with a predetermined calculation table, for at least one of the periodic inspection time and a part replace time; and a display function for displaying the maintenance information.

In order to solve the above problems, the present invention is the electronic device in which the electronic device comprises a position information detection function, having a GPS function, for obtaining the present position information.

In order to solve the above problems, the present invention is the electronic device in which the working environment information includes at least one of the pieces of information regarding temperature, humidity, and density of dust of a location at which the electronic device is positioned.

In order to solve the above problems, the present invention is the electronic device in which the working environment information is obtained by each kind of sensors provided in the electronic device.

In order to solve the above problems, the present invention is the electronic device in which the control function controls the electronic device to determine at least one of terrain and weather of a location, at which the electronic device is positioned, from the present position information.

In order to solve the above problems, the present invention is the electronic device in which the control function controls the electronic device to judge a location, at which the electronic device is positioned, as indoor when the present position information is not detected.

In order to solve the above problems, the present invention is the electronic device in which the predetermined calculation table including constants set corresponding to each of air temperature, humidity, density of dust, weather, terrain, and indoor/outdoor status.

In order to solve the above problems, the present invention is the electronic device in which the control function controls the electronic device to calculate at least one of an inspection time and a part replace time of the electronic device by multiplying a working time of the electronic device with the constant so as to obtain an adequate working time.

In order to solve the above problems, the present invention is the electronic device in which the control function controls the electronic device to calculate at least one of an inspection time and a part replace time of the electronic device by multiplying a number of working times of the electronic device with the constant so as to obtain an adequate number of working times.

In order to solve the above problems, the present invention is the electronic device in which the electronic device is a digital still camera.

BRIEF DESCRIPTION OF THE DRAWINGS

FIG. 2 is a view showing an example of a calculation table A-1 stored in a data base of a host computer shown in FIG. 1.

DETAILED DESCRIPTION OF THE INVENTION

Figure 1:
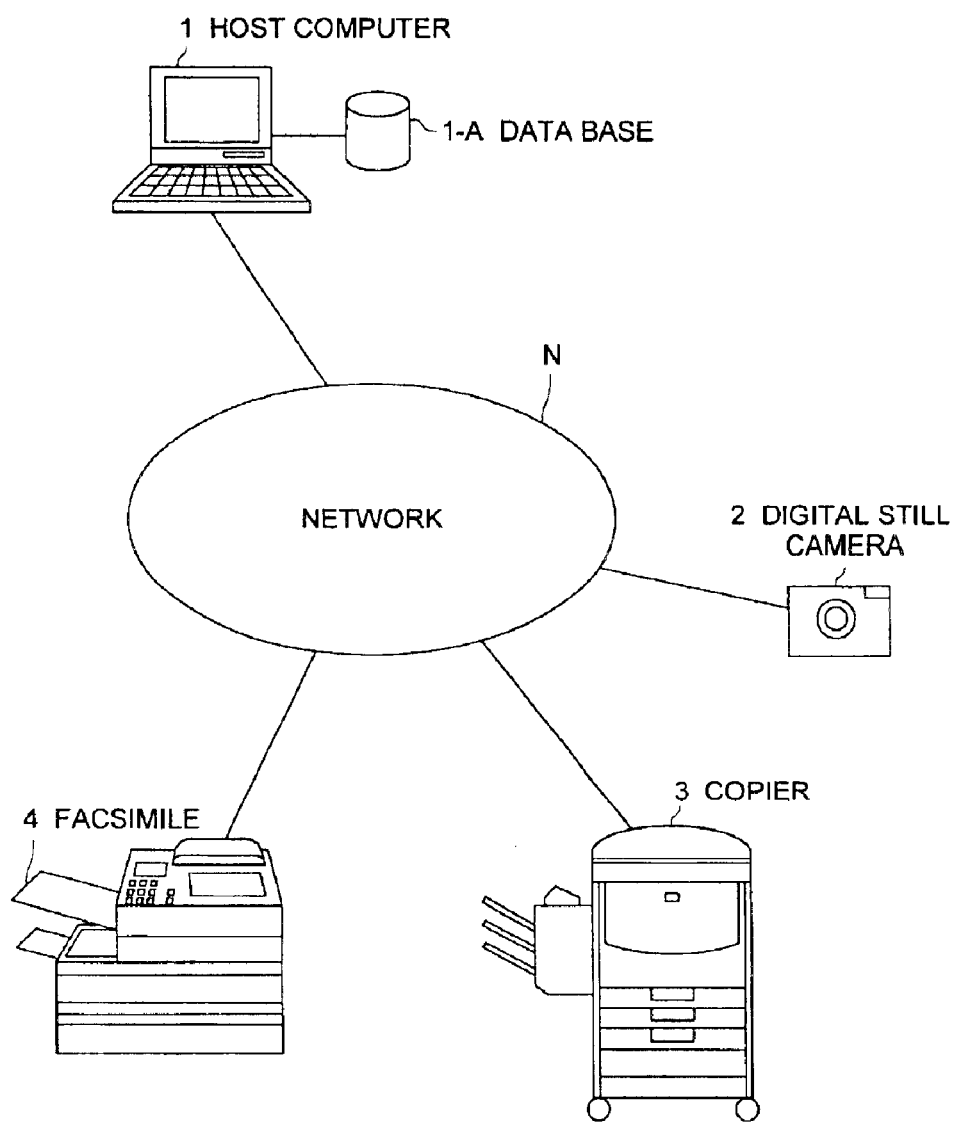
FIG. 1 is an overall structural view of one embodiment of a maintenance information supply system according to the present invention.

Referring to the drawings, an embodiment of a maintenance information supply system according to the present invention and a host computer and electronic device which are its components, will be detailed below. In this connection, a host terminal in the present invention means a host computer which will be described below, and an electronic device terminal in the present invention means each kind of electronic devices (digital still camera, copier, facsimile device) which will be described below. Further, the maintenance information system, host computer, and electronic device can, other than that, cope with various kind of electronic devices such as the cell phone, or digital video camera, however, in order to make a specific explanation below, the digital still camera will be mainly described.

System Configuration
(Structure of a Maintenance Information Supply System and a Host Computer)

Figure 3:
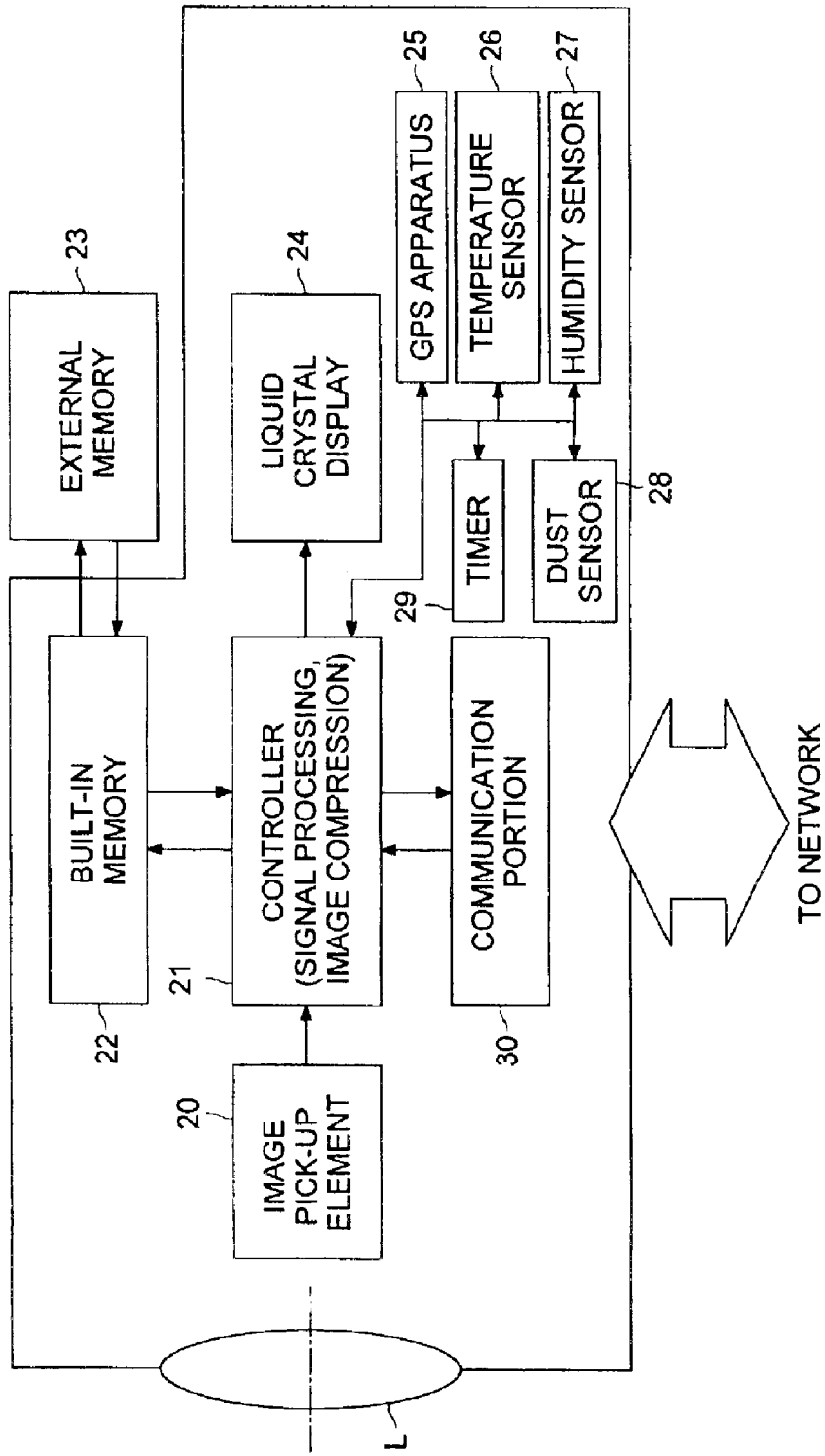
FIG. 3 is an overall structural view showing the structure of a digital still camera shown in FIG. 1.

Referring to FIG. 1 to FIG. 3, initially, the system configuration of the maintenance information supply system in the present embodiment, will be detailed.

In FIG. 1, an overall structural view of the maintenance information supply system in the present invention is shown. As shown in FIG. 1, the maintenance information supply system in the present embodiment is structured by, mainly, a host computer 1 provided with a data base 1-A storing the information relating to a periodic inspection time and/or part replace time of each kind of electronic devices (digital still camera 2, copier 3, facsimile 4), and a calculation table set corresponding to the working environment in which these electronic devices are placed, and each kind of electronic devices (digital still camera 2, copier 3, facsimile 4) provided with the information sending/receiving means for sending the device kind information relating to the electronic device which will receive the supply of the maintenance information, and present position information and/or working environment information to this host computer 1, and for receiving the maintenance information which will be described later. In this connection, the host computer 1 is connected to the network N, and each kind of devices (digital still camera 2, copier 3, facsimile 4) can send and receive the mutual information through this network N. In this connection, in the sending and receiving of the information between each kind of devices (digital still camera 2, copier 3, facsimile 4) and the network N, there is a case where it is conducted by a wire communication means such as the communication cable, and for example, as the wireless communication between the cell phone and the radio wave station, there is a case where it is conducted by the conventional wireless communication means. Further, normally, a plurality of sets of each kind of electronic devices (digital still camera 2, copier 3, facsimile 4), are provided corresponding to the number of users, or installation positions.

The host computer 1 has the data base 1-A storing the information relating to the periodic inspection time and/or part replace time of the each kind of electronic devices (digital still camera 2, copier 3, facsimile 4), and the calculation table set corresponding to the working environment in which these electronic devices are placed, and has a role in which, when, from the each kind of electronic devices (digital still camera 2, copier 3, facsimile 4), the device kind information, present position information and/or the working environment information are sent, according to the device kind information, the information relating to the periodic inspection time and/or part replace time of the electronic device is searched from the data base 1-A, and according to the present position information and/or the working environment information, according to the calculation table, an adequate inspection time and/or the part replace time of this electronic device are calculated, and the result is temporarily stored in the data base 1-A as the maintenance information. Then, the host computer 1 has a role in which, when, from the each kind of electronic devices (digital still camera 2, copier 3, facsimile 4), the request signal to require the supply of the kind of the device information and maintenance information is sent, according to the kind of the device information, the maintenance information relating to the electronic device is searched from the data base 1-A, and is sent to the each kind of electronic devices (digital still camera 2, copier 3, facsimile 4).

Furthermore, it is assumed that the present position information of the each kind of electronic devices (digital still camera 2, copier 3, facsimile 4) is obtained by the position detection means having the GPS function provided in the each kind of electronic devices (digital still camera 2, copier 3, facsimile 4), and the host computer 1 judges the terrain of the spot from this present position information. This is because, when the terrain in which the each kind of electronic devices (digital still camera 2, copier 3, facsimile 4) are placed, is a desert area or coast area, the adequate periodic inspection time or part replace time of the each kind of electronic devices (digital still camera 2, copier 3, facsimile 4) is changed, therefore, it is assumed that host computer 1 judges the terrain of the spot from this present position information, and calculates the adequate inspection time and/or part replace time of the each kind of electronic devices (digital still camera 2, copier 3, facsimile 4).

Further, it is assumed that the host computer 1 links the present position information obtained by the position detection means having the GPS function to the outside information, and judges the weather at the spot. This is because, when the weather of the spot in which the each kind of electronic devices (digital still camera 2, copier 3, facsimile 4) are placed, is rain or snow, the adequate periodic inspection time or part replace time of the each kind of electronic devices (digital still camera 2, copier 3, facsimile 4) is changed, therefore, it is assumed that the host computer 1 judges the weather of the spot from the present position information and the outside information, and corresponding to the weather, calculates the adequate inspection time and/or part replace time of the each kind of electronic devices (digital still camera 2, copier 3, facsimile 4).

Further, when the present position is not detected by the position detection means having the GPS function, the host computer 1 judges that the each kind of electronic devices (digital still camera 2, copier 3, facsimile 4) are positioned in the indoor. This is because, depending on a case where the spot at which the each kind of electronic devices (digital still camera 2, copier 3, facsimile 4) are placed, is in the indoor, or not in the indoor, the adequate periodic inspection time or part replace time of the each kind of electronic devices (digital still camera 2, copier 3, facsimile 4) is changed, therefore, it is assumed that the host computer 1 judges that the spot is in the indoor or not in the indoor, depending on whether the present position is detected, and calculates, corresponding to this, the adequate inspection time and/or part replace time of the each kind of electronic devices (digital still camera 2, copier 3, facsimile 4).

Further, the working environment information means the information relating to the environment such as the air temperature, humidity, amount of the dust in the spot in which for example, the each kind of electronic devices (digital still camera 2, copier 3, facsimile 4) are positioned, and it is assumed that it is obtained by each kind of sensors provided in the each kind of electronic devices (digital still camera 2, copier 3, facsimile 4). Because also these working environment (air temperature, humidity, amount of the dust) is a cause by which the adequate periodic inspection time and/or part replace time of the each kind of electronic devices (digital still camera 2, copier 3, facsimile 4) is changed, it is assumed that the host computer 1 calculates the adequate inspection time and/or part replace time of the each kind of electronic devices (digital still camera 2, copier 3, facsimile 4) corresponding to these working environment. However, these working environment (air temperature, humidity, amount of the dust) is selected and its one portion may also be used.

In FIG. 2, a specific example of the calculation table which is stored in the data base 1-A is shown. As shown in FIG. 2, the calculation table A-1 correlates various working environmental conditions with the constant set corresponding to this, and in the present example, as the working environmental condition, normally, the condition such as the humidity not smaller than 80%, air temperature not lower than 30° C., air temperature not higher than 0° C., number of dust per unit volume (1 cm³) is not smaller than 10 pcs, indoor of normal temperature and normal humidity, at the time of rain, desert area, coast area, is listed. Further, as the constant, the constant of 0.95–1.25 is set for every working environment condition. Hereupon, in order to calculate the adequate inspection time or part replace time of the each kind of electronic devices (digital still camera 2, copier 3, facsimile 4) corresponding to its working environment, this constant is multiplied to the working time or number of working times of the each kind of electronic devices (digital still camera 2, copier 3, facsimile 4). In this connection, relating to the calculation method of this adequate inspection time or part replace time, the digital still camera 2 is taken as an example, and will be detailed later.

(Structure of the Electronic Device)

The digital still camera 2 is, mainly, structured by, as shown in FIG. 3, a lens L which is a means for image-forming the optical image onto the image pick-up element 20 which will be described later, image pick-up element 20 which is a means for converting the optical image image-formed by the lens L into the electric signal (digital signal), controller 21 which is a control means for conducting the signal processing, image compression, and image reproduction processing of the digital signal converted by the image pickup element 20, built-in memory 22 which is a means for temporarily accommodating the image file formed by the processing by the controller 21, external memory 23 which is a means for storing the image file accommodated in the built-in memory 22, liquid crystal display 24 which is a means for displaying the image file stored in the built-in memory 22 and external memory 23 as a photographic image, other than this, the GPS apparatus 25 which is a means for detecting the present position of the digital still camera 2, the temperature sensor 26, humidity sensor 27, and dust sensor 28 which is a means for detecting the working environment in which the digital still camera is placed, and timer 29 which is a means for timing the working time of the digital still camera 2, and furthermore, the communication portion 30 which is a means for sending the detection result from the GPS apparatus 25, temperature sensor 26, humidity sensor 27, dust sensor 28 and timer 29 and the device kind information which is the information relating to the kind of the device of the digital still camera 2, to the host computer 1 through the network N, and is also a means for receiving the maintenance information relating to the digital still camera 2 sent from the host computer 1 through the network N.

Furthermore, the controller 21 also has a role to display the maintenance information on the liquid crystal display 24. Further, it is assumed that the device kind information is previously stored in the built-in memory 22. Further, the GPS apparatus 25 may also be replaced with a case that, for example, an accessory such as the GPS card having the GPS function is connected to the digital still camera 2.

A supply Method of the Maintenance Information

Figure 4:
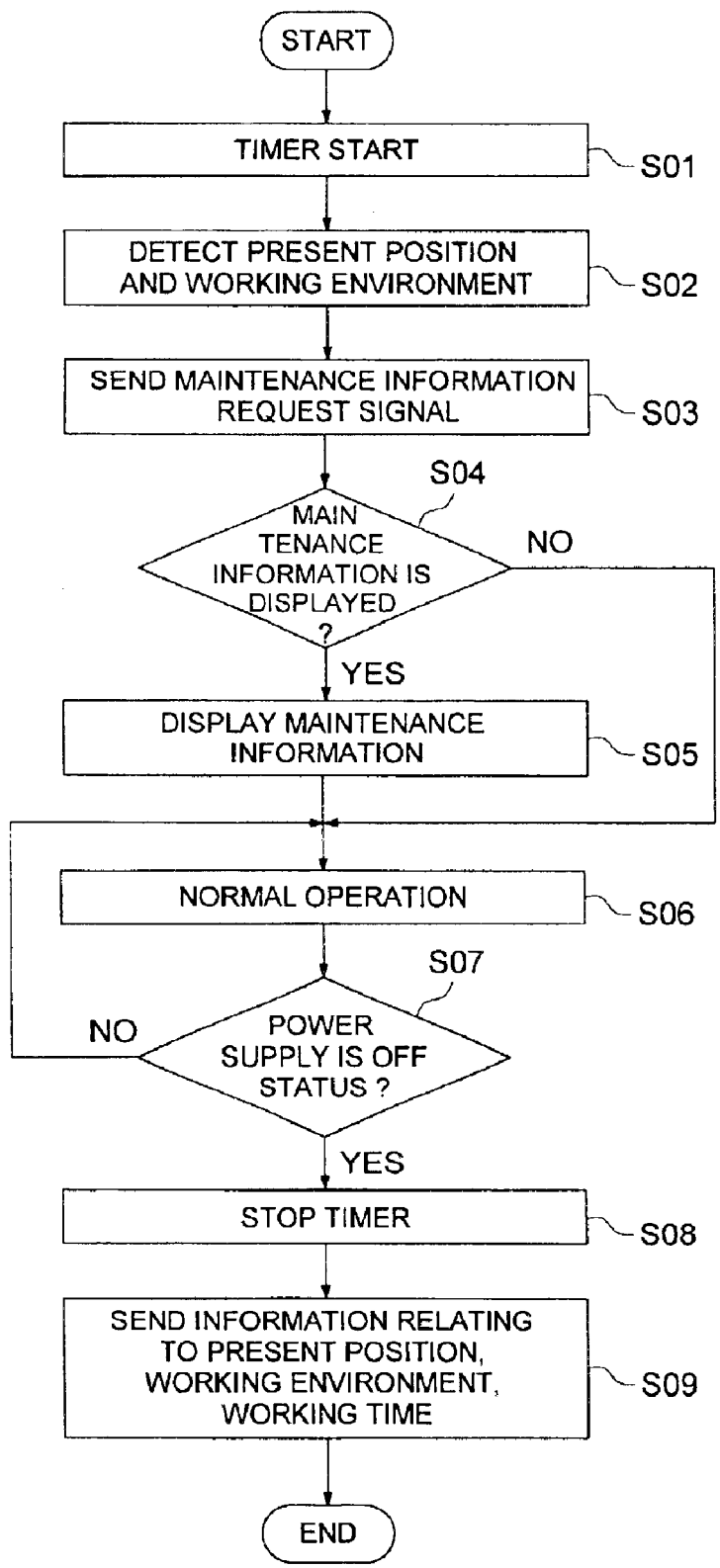
FIG. 4 is a flowchart explaining a flow of the processing for the calculation of an "adequate inspection time" of the host computer shown in FIG. 1.
Figure 5:
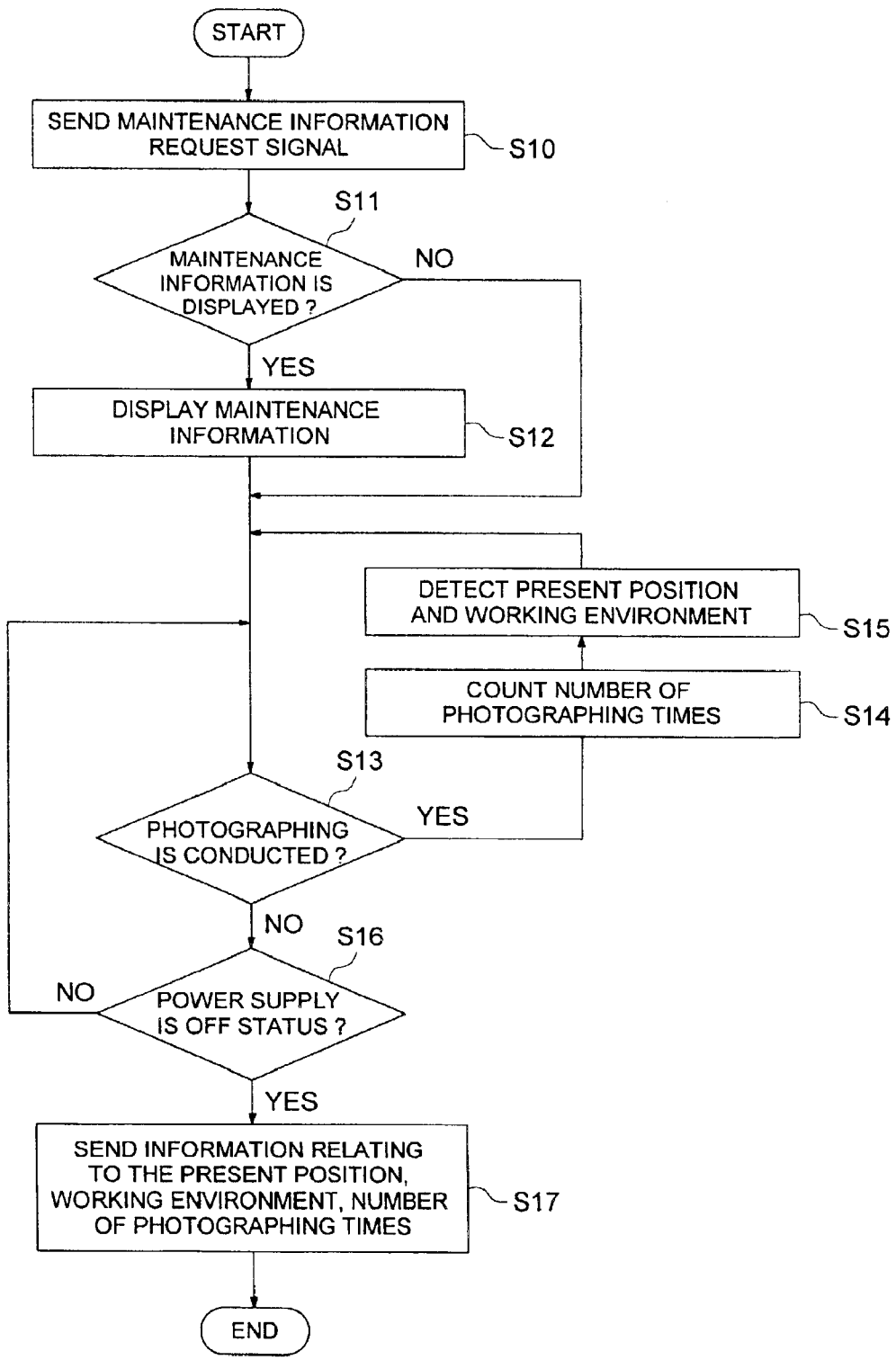
FIG. 5 is a flowchart explaining a flow of the processing for the calculation of an "adequate replace time of the part" of the host computer shown in FIG. 1.

Next, referring to FIGS. 1–3, the supply method of the maintenance information from the host computer to the electronic device in the maintenance information supply system in the present embodiment will be detailed according to a flowchart shown in FIG. 4 and FIG. 5, by taking the digital still camera as an example.

Furthermore, in the present example, the adequate inspection time of the digital still camera 2 is calculated on the basis of the working time of the digital still camera 2, and further, the adequate part replace time of the digital still camera 2 is calculated on the basis of the number of working times (including the number of photographing times, number of flashing times) for each part, however, its basis may also be exchanged each other and calculated.

(Calculation of the Adequate Inspection Time)

Initially, according to the flowchart shown in FIG. 4, a flow of the processing until the adequate inspection time of the digital still camera 2 is calculated on the basis of the working time of the digital still camera, will be described. As shown in the same view, in the digital still camera 2, when the power supply is in the "ON" status, the clocking of the working time by the timer 29 is started at once (S01). Simultaneously, the present position is detected by the GPS apparatus 25, the air temperature is detected by the temperature sensor 26, and the humidity is detected by the humidity sensor 27, and further, the number of dust per unit volume (1 cm$^3$) is detected by the dust sensor 29 (S02). Then, the request signal of the maintenance information is sent from the controller 21 to the host computer 1 (S03). The communication portion 30 receives the request signal of the maintenance information and receives the maintenance information sent from the host computer 1, and the controller 21 judges whether this information is displayed on the liquid crystal display 24 (S04). The basis of the judgement at this time is the information whether the received maintenance information, that is, the adequate inspection time for the digital camera 2 already comes. Herein, when it is judged that the adequate inspection time is already come (Yes), this adequate inspection time, that is, the maintenance information is displayed on the liquid crystal display 24 (S05), and the normal operation is conducted (S06). Inversely, when it is judged that the adequate inspection time is not come yet (No), this maintenance information is not displayed on the liquid crystal display 24, and the normal operation is conducted (S06). Then, when the power supply is in the "OFF" status in the digital still camera 2, the clocking of the working time by the timer 29 is stopped, and the working time is calculated (S08). Then, the working time information, present position information and/or working environment information (air temperature, humidity, dust density) of the digital still camera 2, are sent to the host computer 1 through the network N (S09).

In this connection, in the present example, it is made that the present position information or working environment information is obtained at the power supply "ON" time of the digital still camera 2, however, it may also be made that these information is obtained, for example, at the power supply "OFF" time of the digital still camera 2.

The host computer 1 received these information transmission calculates the adequate inspection time for the digital still camera according to the calculation table A-1. The calculation method of this adequate inspection time will be described below.

For example, it is assumed that normal periodic inspection time of the digital still camera 2 is at every working time 10000 (time), and the content of the working time information, present position information, working environment information (air temperature, humidity, dust density) is that the working time is 5 hours, weather of the spot is rain, humidity is 85%, air temperature is 25° C., number of dust per unit volume (1 cm$^3$) is 7 pcs, and terrain is the coast area.

The host computer 1 applies these contents to the calculation table A-1, and determines respectively the constants corresponding to them. In this connection, in the present example, the weather, humidity, and terrain are the relevant items.

This constant is multiplied to the working time of the digital camera 2, and the calculation expression of the this time in the present example is as follows.

Working time of this time=5 (hours)×1.05 (weather)×1.25 (humidity)×1.20 (terrain)=7.88 [hours]     [Expression 1]

As described above, the host computer 1 calculates the working time of this time as 7.88 {hours} according to the calculation table A-1 on the basis of the present position information and/or working environment information (air temperature, humidity, dust density), and as the result, the time point at which the remained working times 9992.12 [hours] are consumed, is judged as the adequate inspection time. Accordingly, in this time, as the result of consideration of the working environment condition (weather, humidity, terrain) of the digital camera 2, the inspection time is advanced by the difference: 7.88 [hours]−5 [hours]=2.88 [hours].

In this connection, the calculation of the above-described adequate inspection time is repeatedly conducted every time when the power supply of the digital camera is turned to the "OFF" status, and accompanied by this, the adequate inspection time is also changed at any time.

In this connection, also in the parts (including units) constituting the digital still camera 2, because there is a part in which, on the basis of the working time of the digital still camera 2, the adequate part replace time can be calculated, also relating to such a part, in the same manner as described above, it is defined that the calculation table is respectively provided, and its adequate part replace time is calculated. As the specific example of such a part (including a unit), the built-in battery or liquid crystal display 24 can be listed. Further, when it is assumed as the aspect that the inspection is conducted without limiting to the part replacement, for example, also for the dirt of the image pick-up element 20, dirt of the lens L and the optical system, dirt of the connection portion of the communication portion 29, dirt of the view finder, or dirt of the inside substrate, the inspection can be conducted at the adequate time on the basis of the working time of the digital still camera 2.

(Calculation of the Adequate Part Replace Time)

Next, according to a flowchart shown in FIG. 5, on the basis of the working times of the digital still camera 2, a flow of the processing until the adequate replace time of a part constituting the digital still camera 2 is calculated, will be described. In this connection, in the present example, as the working times, the photographic times of the digital still camera is taken. As shown in FIG. 5, in the digital still camera 2, when the power supply is turned to the "ON" status, initially, the request signal of the maintenance information is sent from the controller 21 to the host computer 1 (S10). Then, the communication portion 30 receives the maintenance information sent from the host computer 1 corresponding to the request signal of the maintenance information, and the controller 21 judges whether this is displayed on the liquid crystal display 24 (S11). The judgement base in this case is whether the received maintenance information, that is, the adequate part replace time is already come. Herein, when it is judged that the adequate part replace time is already come (Yes), this maintenance information is displayed on the liquid crystal display 24 (S12), and the normal operation is conducted. Herein, when it is judged that the adequate part replace time is not come yet (No), this maintenance information is not displayed on the liquid crystal display 24, and the normal operation is conducted. Further, when the normal operation is conducted, the controller 21 always judges whether the photographing is conducted in the digital still camera 2 (S13), and herein, when it is judged that the photographing is conducted (Yes), the photographing times are counted (S14). Further, simultaneously to that, by the GPS apparatus 25, temperature sensor 26, humidity sensor 27 and dust sensor 28, the present position or working environment is detected (S15). In this connection, a flow of the processing in the above-described S13–S15 is repeatedly conducted every when the photographing is conducted in the digital still camera 2. Then, by the controller 21, it is judged whether the power supply of the digital still camera 2 is turned to the "OFF" status (S16), and herein, when it is judged that it is turned to the "OFF" status (Yes), the photographing times, present position information and/or working environment information (air temperature, humidity, dust density) are sent from the communication portion 30 to the host computer 1 through the network N (S17).

Furthermore, in the present example, it is defined that the present position information or working environment information (air temperature, humidity) is obtained every when the photographing is conducted, however, these information may also be made such that they are collectively obtained, for example, at the time of the power supply "OFF".

The host computer 1 which received these information transmission calculates the adequate part replace time for the digital still camera 2 according to the calculation table A-1. The calculation method of this adequate part replace time is the method described below. However, in the below description, for the convenience of the brief description, it is defined that the present position information or working environment information (air temperature, humidity, dust density) is collectively obtained at the time of the power supply "OFF" of the digital still camera 2.

For example, the part replace time in the normal time of the unit portion such as the shutter and diaphragm of the digital still camera 2 is assumed as the photographing times 10000[times], and the content of the photographing times information, the present position information, and working environment information (air temperature, humidity, dust density) which are sent from the digital still camera 2, is assumed like that the number of photographing times are 24 [times], weather of the spot is cloudy, humidity is 65%, air temperature is 20° C., number of dust per unit volume (1 cm$^3$) is 12 pcs, and the terrain is the desert area.

The host computer 1 applies these contents to the calculation table A-1, and the constants corresponding to them are respectively determined. In this connection, in the present example, the number of the dusts per unit volume, and terrain are relevant items.

This constant is multiplied to the number of photographing times of the digital camera 2, and the calculation expression of the number of photographing times of this time in the present example, is as follows.

The number of photographing times=24[times]×1.20 (number of dusts per unit volume)×1.25 (terrain)=36 [times].[Expression 2]

As described above, the host computer 1 calculates the photographing times of this time as 36[times] based on the present position information and/or working environment information (air temperature, humidity, dust density) according to the calculation table A-1, and as the result, the time point at which the remained photographing times 9964 [times] are consumed, is judged as the adequate part replace time. Accordingly, in this time, as the result of consideration of the working environment condition (dust density, terrain) of the digital camera 2, the part replace time of the unit portion such as the shutter and diaphragm of the digital still camera 2 is advanced by the difference of the photographing times: 36 [times]–24 [times]=12 [times].

Hereupon, the calculation of the above-described adequate part replace time is repeatedly conducted every when the power supply of the digital still camera 2 turns to the "OFF" status, and accompanied by this, the adequate part replace time is also changed at any time.

In this connection, as a specific example of the case where the adequate part replace time can be calculated on the basis of this number of working times, strobe apparatus (number of light emission times is the base), each kind of switch, or each kind of button, can be listed. It is defined that, relating also to these parts, the calculation table is provided for each part, and on the basis of the number of working times of the digital still camera, the adequate part replace time is calculated. Further, it is a matter of course for these parts, also in the other part (including a unit) constituting the digital camera 2, because there are parts whose adequate inspection time can be calculated on the base of the number of working times, also for these parts, in the same manner as described above, it is defined that the calculation tables are respectively provided and the adequate inspection time is calculated.

Hereupon, when both of the calculation of the adequate inspection time of the digital still camera 2 and the calculation of the adequate inspection time of the part constituting the digital still camera are conducted, it is defined that the processing for them is simultaneously and parallely conducted in the host computer 1.

The host computer 1 temporarily stores the information for the adequate inspection time of the digital still camera 2 and/or the adequate inspection time of the part constituting the digital still camera 2 calculated as described above, in the database 1-A, and next, when the power supply of the digital still camera 2 turns to "ON" status and the maintenance information request signal is sent from the digital still camera 2, these information are sent to the digital still camera 2 as the maintenance information.

Then, the digital still camera 2 received this sent maintenance information displays the information for that (inspection recommendation display and/or replacement recommendation display) on the liquid crystal display 24 of the digital still camera at the time of "ON" status of the power supply of the digital still camera 2 when the information of the adequate inspection time and/or part replace time already arrives.

Hereupon, this inspection recommendation display and/or replacement recommendation display may also be displayed in advance before the information of the adequate inspection time and/or part replace time comes.

Further, in the digital still camera 2, it is defined that, when the inspection and/or replacement of the part are conducted, and next, when the power supply of the digital still camera 2 is turned to the "ON" status, and the maintenance request signal is sent from the digital still camera 2 to the host computer 1, the signal of this effect is sent together with that, and the host computer 1 received this, conducts the processing to reset the parameters relating to the working time or the number of photographing times of the digital still camera 2.

As described above, in the maintenance information supply system, host computer, and electronic device according to the present invention, because this system is structured in such a manner that the host computer which is a component of the maintenance information supply system calculates the adequate inspection time and/or part replace time in the light of its working environment, and automatically reports this to each electronic device, and an electronic device which is a component of the maintenance information supply system receives this, and the display of this information is automatically conducted, the user can know the adequate inspection time or part replace time, and can avoid the unnecessary inspection and together with that, when the inspection or part replace is conducted at the adequate time, the product life of the electronic device which the user has, can be extended.

Next, referring to the drawings, an embodiment of the electronic device according to the present invention having therein the same function as the above-described maintenance information system according to the present invention, will be detailed. Hereupon, the electronic device according to the present invention can cope with various electronic devices such as, for example, the copier, facsimile, cell phone, digital video camera, however, for the specific explanation below, the digital still camera is taken as an example, and detailed.

Overall Structure

Figure 6:
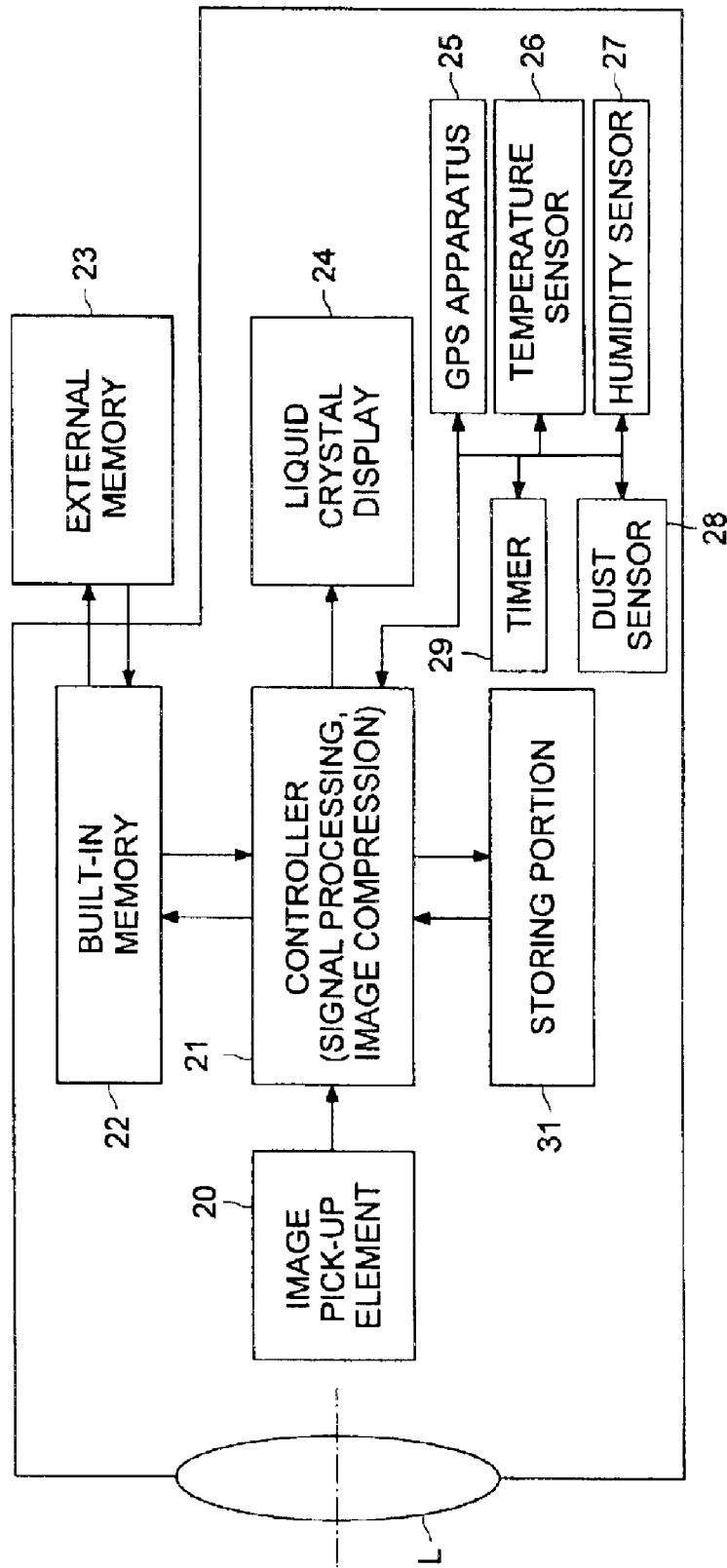
FIG. 6 is an overall structural view in one embodiment of a digital still camera which is an electronic device according to the present invention.

In FIG. 6, the overall structural view in an embodiment of the digital still camera which is an electronic device according to the present invention, is shown. As shown in FIG. 6, the digital still camera is mainly structured by: a lens L which is a means for image-forming the optical image on the image pick-up element 20 which will be described later; an image pick-u@ element 20 which is a means for converting the optical image image-formed by the lens L into an electric signal (digital signal); a controller 21 which is a control means for conducting the signal processing, image compression, and image reproduction processing of the digital signal converted by the image pick-up element 20; a built-in memory 22 which is a means for accommodating the image file made by the processing by the controller 21; an external memory 23 which is a means for storing the image file accommodated in the built-in memory 22; a liquid crystal display 24 which is a means for displaying the image file stored in the built-in memory 22 and the external memory 23 as the photographic image; other than that, a GPS apparatus 25 which is a means for detecting the present position of the digital still camera 2; a temperature sensor 26 which is a means for detecting the working environment in which the digital still camera is placed, humidity sensor 27 and dust sensor 28; a timer 29 which is a means for clocking the working time of the digital still camera 2; and further, a storing portion 31 for storing the information for the periodic inspection time and/or part replace time of the digital still camera 2 and for storing a calculation table set corresponding to the working environment in which the electronic device is placed. Hereupon, the GPS apparatus 25 may also be changed with a case that, for example, the accessory such as the GPS card having the GPS function is connected to the digital camera.

The controller 21 calls the information for the periodic inspection time and/or part replace time of the digital still camera 2 from the storing portion 31, when the present position information and/or working environment information are sent from the GPS apparatus 25, temperature sensor 26, humidity sensor 27, or dust sensor 28, and base on the present position information and/or working environment information, according to the calculation table, calculates its adequate inspection time and/or part replace time, and in the case where the power supply of the digital camera is turned "ON" next time, when the information of the adequate inspection time and/or part replace time arrives already, has the role to display this information on the liquid crystal display 24 as the maintenance information.

Further, it is defined that the controller 21 judges the terrain of the spot from the present position information obtained by the GPS apparatus 25. This is for the reason that, when the terrain in which the digital still camera is placed is the desert area, or coast area, the adequate periodic inspection time or part replace time of the digital still camera is changed, and it is defined that the controller 21 judges the terrain of the spot from the present position information, and calculates the adequate inspection time and/or part replace time of the digital still camera corresponding to the terrain.

Further, it is assumed that, when the controller 21 links the present position information obtained by the GPS apparatus 25 to the outside information, it judges the weather at the spot. This is because, when the weather of the spot in which the digital still camera 2 is placed, is rain or snow, the adequate periodic inspection time or part replace time of the digital still camera is changed, therefore, it is assumed that the controller 21 judges the weather of the spot from the present position information and the outside information, and corresponding to the weather, calculates the adequate inspection time and/or part replace time of the digital still camera.

Further, when the present position is not detected by the GPS apparatus 25, the controller 21 judges that the digital still camera is positioned in the indoor. This is because, depending on a case where the spot in which the digital still camera is placed, is in the indoor, or not in the indoor, the adequate periodic inspection time or part replace time of the digital still camera is changed, therefore, it is assumed that the controller 21 judges that the spot is in the indoor or not in the indoor, depending on whether the present position is detected, and calculates, corresponding to this, the adequate inspection time and/or part replace time of the digital still camera.

Further, the working environment information means the information relating to the environment such as the air temperature, humidity, amount of the dust in the spot in which for example, the digital still camera is positioned, and it is assumed that it is obtained by each kind of sensors (temperature sensor 26, humidity sensor 27, dust sensor 28) provided in the digital still camera. Because also these working environment (air temperature, humidity, amount of the dust) is a cause by which the adequate periodic inspection time and/or part replace time of the digital still camera is changed, it is assumed that the controller 21 calculates the adequate inspection time and/or part replace time of the digital still camera corresponding to its working environment. However, these working environment (air temperature, humidity, amount of the dust) are selected and its one portion may also be used.

Applying FIG. 2 correspondingly, a specific example of the calculation table which is stored in the storing portion 31 is shown. As shown in FIG. 2, the calculation table A-1 correlates various working environmental conditions with the constant set corresponding to this, and in the present example, as the working environmental condition, normally, the condition such as the humidity not smaller than 80%, air temperature not lower than 30° C., air temperature not higher than 0° C., number of dust per unit volume (1 cm$^3$) is not smaller than 10 pcs, indoor of normal temperature and normal humidity, at the time of rain, desert area, coast area, is listed. Then, as the constant, the constant of 0.95–1.25 is set for every working environment. In this connection, in order to calculate the adequate inspection time or part replace time of the digital still camera corresponding to its working environment, this constant is multiplied to the working time or number of working times of the digital still camera.

(Supply Method of the Maintenance Information)

Figure 7:
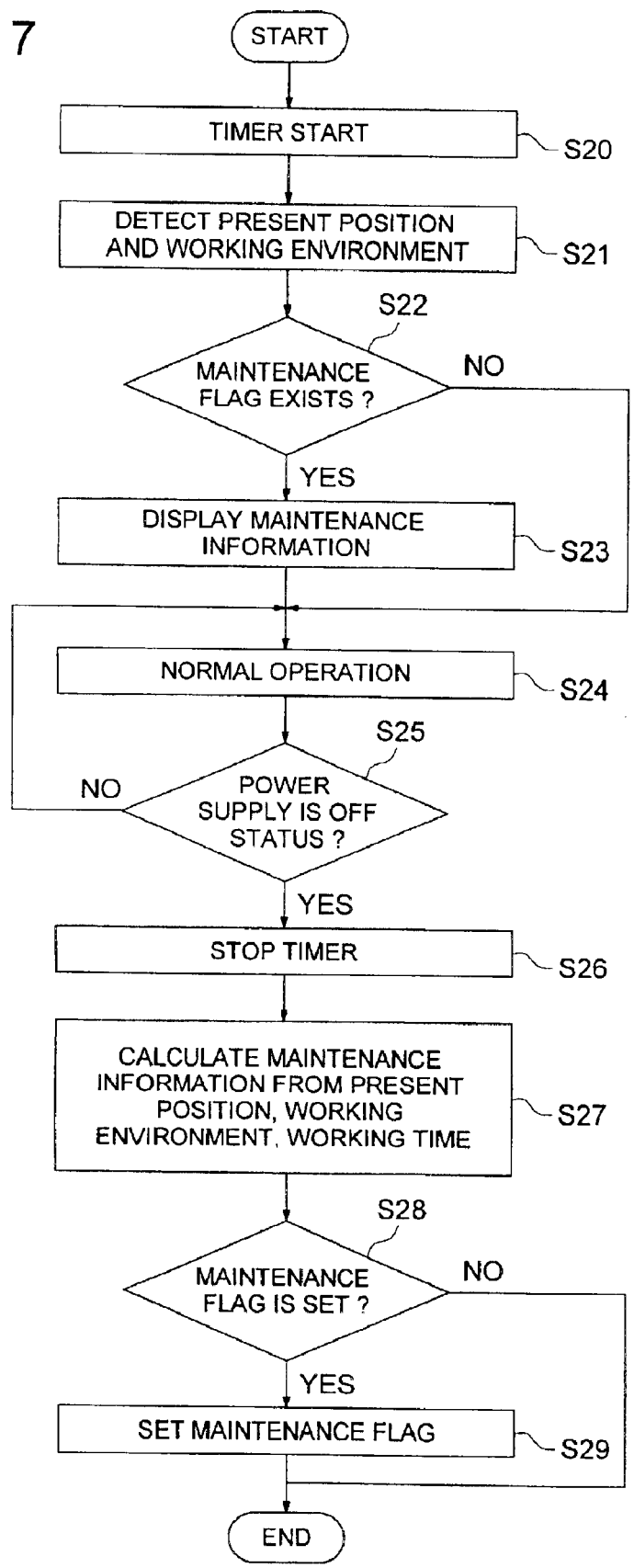
FIG. 7 is a flowchart explaining a flow of the processing for the calculation of an "adequate inspection time" of the digital still camera shown in FIG. 6.
Figure 8:
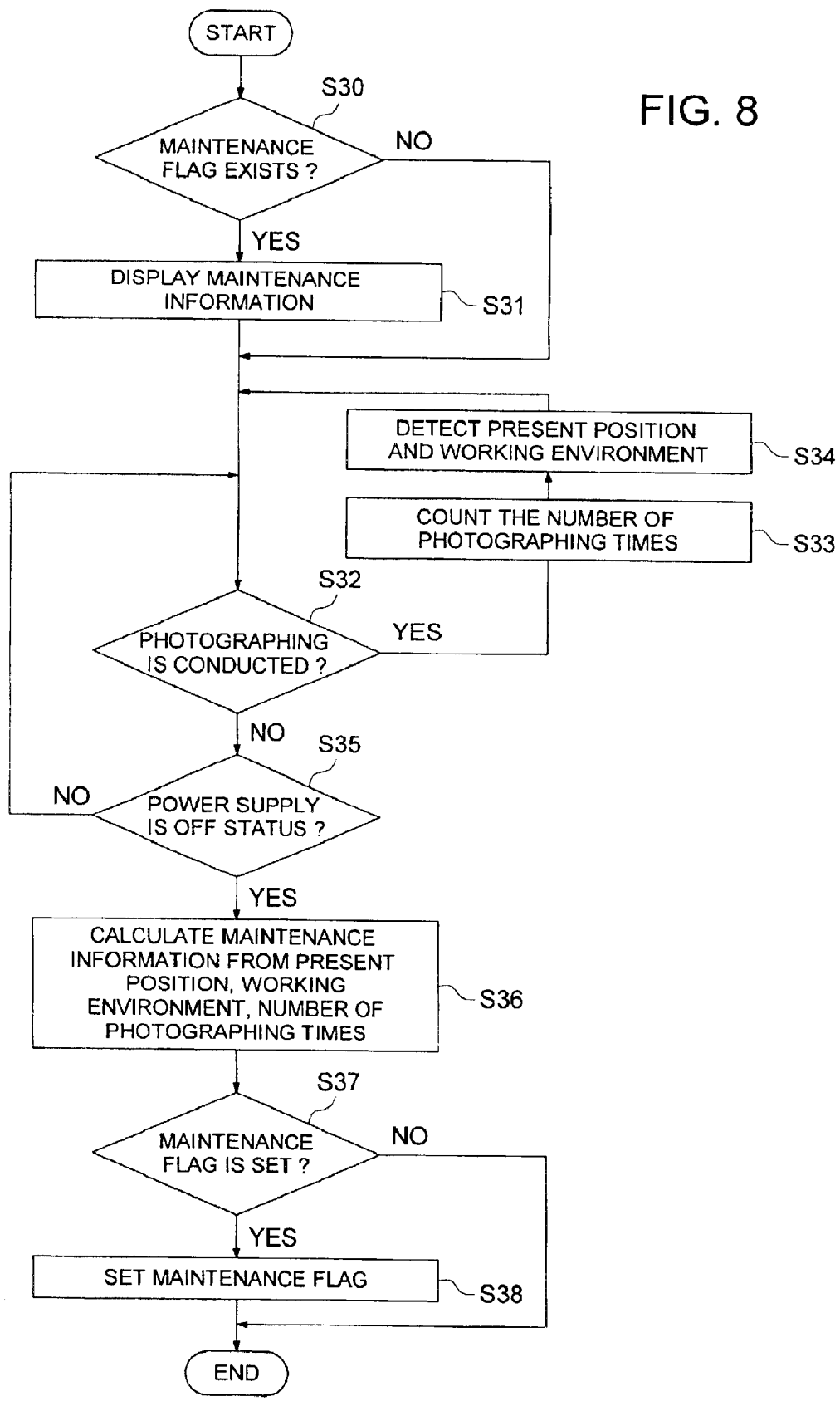
FIG. 8 s a flowchart explaining a flow of the processing for the calculation of an "adequate replace time of the part" of the digital still camera shown in FIG. 6.

Next, referring to FIG. 2 and FIG. 6, the supply method of the maintenance information of the electronic device (digital camera) in the present embodiment will be detailed according to the flowchart shown in FIG. 7 and FIG. 8.

Hereupon, in the present example, it is defined that the adequate inspection time of the digital still camera is calculated based on the working time of the digital still camera, and further, the adequate part replace time of the digital still camera is calculated on the basis of the number of working times (number of photographing times, light emission times) for each part, however, these cases may also be calculated by exchanging its basis with each other.

(Calculation of the Adequate Inspection Time)

Initially, according to the flowchart shown in FIG. 7, on the basis of the working time of the digital still camera, a flow of the processing until the adequate inspection time of the digital still camera is calculated is described. As shown in the same view, in the digital still camera, when the power supply turns to the "ON" status, the clocking of the working time is started at once by the timer 29 (S20). Simultaneously with this, the present position is detected by the GPS apparatus 25, air temperature is detected by the temperature sensor 26, humidity is detected by the humidity sensor 27, and further, the number of dusts per unit volume (1 cm$^3$) is detected by the dust sensor 29 (S21). Then, the controller 21 judges whether a maintenance flag is set in the maintenance information (refer to the later description) of the digital still camera (S22), and herein, when it is judged that the maintenance flag is set (Yes), this maintenance information is displayed on the liquid crystal display 24 (S23), and the controller 21 enters into the normal operation (S24). Inversely, when it is judged that maintenance flag is not set (No), this maintenance information is not displayed on the liquid crystal display 24 and the controller 21 enters into the normal operation (S24). Hereupon, this maintenance flag is a flag in which, after the maintenance flag is set, when the power supply is turned to the "ON" status again in the digital still camera, it is set so that the maintenance information is automatically displayed on the liquid crystal display 24, in the case where the maintenance information formation is conducted later, when the maintenance information, that is, the adequate inspection time relating to the digital still camera arrives already, it is set in the maintenance information. Then, when the power supply is turned to the "OFF" status in the digital still camera (S25), the clocking of the working time by the timer 29 is stopped at once, and the working time is calculated (S26). Then, the controller 21 calculates the adequate inspection time relating to the digital still camera, according to the calculation table A-1 from the working time information, present position information and/or working environment information (air temperature, humidity, dust density) of the digital still camera, and it is defined as the maintenance information (S27). Further, in this case, it is judged whether this maintenance information, that is, the adequate inspection time relating to the digital still camera arrives already (S28), when it arrives already (Yes), the maintenance flag is set to this maintenance information (S29) and the processing is completed. When it is not arrived (No), the maintenance flag is not set to this maintenance information and the processing is completed.

Hereupon, the calculation of the adequate inspection time of the digital still camera is repeatedly conducted every time when the power supply of the digital still camera is turned to "OFF" status, and accompanied by this, the adequate inspection time is changed at any times.

Further, as the maintenance information, other than a display of the adequate inspection time relating to the digital still camera, the display (inspection recommended display) of that effect may also be conducted. Further, these displays may also be conducted in advance before the adequate inspection time arrives.

Further, in the present example, it is defined that the present position information or working environment information is obtained at the time of the power supply "ON" of the digital camera, however, these information may also be obtained, for example, at the time of the power supply "OFF" of the digital camera.

Further, because a method in which the controller 21 calculates the adequate replace time relating to the digital camera according to the calculation table A-1, is the same as the method by the host computer 1 of the above-described maintenance information supply system, the description herein is omitted.

(Calculation of the Adequate Part Replace Time)

Next, according to the flowchart shown in FIG. 8, a flow of the processing until, on the basis of the number of working times of the digital still camera, the adequate replace time of the part constituting the digital still camera is calculated, will be described. Hereupon, in the present example, as the number of working times, the number of photographing times of the digital still camera is listed. As shown in the same view, in the digital still camera, when the power supply is turned to the "ON" status, the controller 21 judges whether the maintenance flag is set in the maintenance information of the digital camera (S30). Herein, when it is judged that the maintenance flag is set (Yes), the maintenance information is displayed on the liquid crystal display 24 (S31), and the controller 21 enters into the normal operation. Inversely, when it is judged that the maintenance flag is set (No), the maintenance information is not displayed on the liquid crystal display 24, and the controller 21 enters into the normal operation. Hereupon, this maintenance flag is set so that, after the maintenance flag is set, when the power supply is turned again to the "ON" status in the digital still camera, the maintenance information is automatically displayed on the liquid crystal display 24, and in the case where the maintenance information is formed later, when the maintenance information, that is, the adequate inspection time relating to the digital still camera arrives already, it is set to the maintenance information. Further, in the normal operation, the controller 21 always judges whether the photographing is conducted in the digital still camera (S32), herein when it is judged that the photographing is conducted (Yes), the number of the photographing times is counted (S33). Further, simultaneously with that, the present position or working environment is detected by the GPS apparatus 25, temperature sensor 26, humidity sensor 27 and dust sensor 28 (S34). Hereupon, the flow of the processing in the above-described S32–S34 is repeatedly conducted every when the photographing is conducted in the digital still camera. Then, by the controller 21, it is judged whether the power supply of the digital still camera is turned to "OFF" status (S35), herein, when it is judged that it is turned to the "OFF" status (Yes), the controller 21 calculates from the information of the number of photographing times, present position information and/or working environment information of the digital still camera (air temperature, humidity, dust density), according to the calculation table A-1, the adequate part replace time relating to the digital still camera, and it is made the maintenance information (S36). Further, in this case, it is judged whether the maintenance information, that is, the adequate part replace time relating to the digital still camera is already arrived (S37), when it is arrived already (Yes), the maintenance flag is set to it (S38), and the processing is completed. When it is not arrived (No), the maintenance flag is not set to it and the processing is completed.

Hereupon, the calculation of the adequate part replace time of the digital still camera is repeatedly conducted every when the power supply of the digital still camera is turned to the "OFF" status, and accompanied by this, the adequate part replace time is changed at any time.

Further, as the maintenance information, other than a display which displays the adequate part replace time relating to the digital still camera, the display of that effect (replacement recommendation display) may also be conducted. Further, these displays may also be conducted in advance before the adequate replace time comes.

Further, in the present example, it is defined that the present position information or working environment information (air temperature, humidity, dust density) is obtained every when the photographing is conducted, however, these information may also be collectively obtained at the time of, for example, the power supply "OFF".

Further, because the method by which the controller 21 calculates the adequate part replace time relating to the digital camera according to the calculation table A-1 is the same as the method by the host computer 1 of the above-described maintenance information supply system, the description herein is neglected.

Hereupon, when the both of the calculation of the adequate inspection time of the digital still camera described above, and the calculation of the adequate inspection time of the part constituting the digital still camera are conducted, the processing relating to them is defined that they are simultaneously parallely conducted in the controller 21.

Furthermore, it is defined that, in the digital still camera, when the inspection and/or part replacement are conducted, the controller 21 conducts the processing to reset the parameters relating to the working time or the number of photographing times of the digital camera stored in the storing portion 31.

As described above, because it is structured such that the electronic device according to the present invention calculates the adequate inspection time and/or part replace time in the light of the working environment condition, and this is automatically displayed, the user can know the adequate inspection time and/or part replace time, and it can be avoided that the unnecessary inspection is conducted, and together with that, when the inspection or part replacement is conducted at the adequate time, the product life of the electronic device can be extended.

As described above, according to the maintenance information supply system, host computer, and electronic device according to the present invention, the present invention is structured such that the host computer which is a component of the maintenance information supply system calculates the adequate inspection time and/or part replace time in the light of its working environment condition to each of the electronic devices which the user has, and automatically reports this to each electronic device, and because the electronic device is structured such that the electronic device which is a component of the maintenance information supply system receives this, and automatically conducts the display of that effect, the user can know the adequate inspection time and/or part replace time, and it can be avoided that the unnecessary inspection is conducted, and together with that, when the inspection or part replacement is conducted at the adequate time, the product life of the electronic device which the user has, can be extended.

As described above, according to the electronic device according to the present invention, because the electronic device is structured such that it calculates the adequate inspection time and/or the part replace time in the light of its working environment condition and automatically display it, the user can know the adequate inspection time or part replace time, and it can be avoided that the unnecessary inspection is conducted, and together with that, when the inspection or part replacement is conducted at the adequate time, the product life of the electronic device can be extended.

What is claimed is:

1. A maintenance information supply system for use with electronic device terminals of different kinds, comprising:
    a host terminal including a database for storing information regarding at least one of a periodic inspection time and a part replace time for a predetermined electronic device terminal from among the different kinds of terminals;
    said predetermined electronic device terminal including a position information detection means for detecting present position information and working environment information of said electronic device terminal;
    said predetermined electronic device terminal further including an information sending/receiving means for sending and receiving said information between said electronic device terminal and said host terminal;
    wherein said sending/receiving means of said predetermined electronic device terminal sends to said host terminal device kind information, present position information and working environment information of said predetermined electronic device terminal;
    wherein said host terminal includes means for, according to said device kind information sent from said predetermined electronic terminal, searching said information regarding at least one of said periodic inspection time of said electronic device terminal and said part replace time from said database;
    wherein said host terminal includes means for calculating maintenance information according to (i) said present position information and said working environment information of said predetermined electronic device terminal, sent from said predetermined electronic device terminal, and (ii) a predetermined calculation table, and for sending said maintenance information to said electronic device terminal; and
    wherein said sending/receiving means of said electronic device terminal receives said maintenance information from said host terminal.

2. The maintenance information supply system of claim 1, wherein said maintenance information includes at least one of an inspection time and a part replace time.

3. The maintenance information supply system of claim 1, wherein said maintenance information is displayed by said electronic device after said electronic device terminal receives said maintenance information sent from said host terminal.

4. The maintenance information supply system of claim 1, wherein said electronic device terminal comprises a position information detection means, having a GPS function, for obtaining said present position information.

5. The maintenance information supply system of claim 1, wherein said working environment information includes information regarding at least one of temperature, humidity, and density of dust of a location at which said predetermined electronic device terminal is positioned.

6. The maintenance information supply system of claim 5, wherein said working environment information is obtained by at least one sensor provided in said electronic device terminal.

7. The maintenance information supply system of claim 1, wherein said host terminal determines at least one of terrain and weather of a location at which said predetermined electronic device terminal is positioned, from said present position information.

8. The maintenance information supply system of claim 7, wherein said host terminal judges said location at which said electronic device terminal is positioned, as indoor when said present position information is not detected.

9. The maintenance information supply system of claim 1, wherein said predetermined calculation table includes constants set corresponding to each of air temperature, humidity, density of dust, weather, terrain, and indoor/outdoor status.

10. The maintenance information supply system of claim 9, wherein said host terminal calculates at least one of an inspection time and a part replace time of said electronic device terminal by multiplying a working time of said electronic device terminal with at least one of said constants so as to obtain an adequate working time.

11. The maintenance information supply system of claim 9, wherein said host terminal calculates at least one of an inspection time and a part replace time of said electronic device terminal by multiplying a number of working times of said electronic device terminal with at least one of said constants so as to obtain an adequate number of working times.

12. The maintenance information supply system of claim 1, wherein said electronic device terminal is a digital still camera.

13. A host computer, capable of communicating with a predetermined electronic device through a network including a telephone line, comprising:
   a database for storing information regarding at least one of a periodic inspection time and a part replace time for a predetermined electronic device of at least one kind from among a plurality of different kinds for which the system is adapted to be used;
   wherein said host computer includes means for searching said information regarding at least one of said periodic inspection time of said predetermined electronic device and said part replace time from said data base database according to device kind information when said device kind information of said predetermined electronic device and present position information and working environment information of said predetermined electronic device are received from said predetermined electronic device through said network;
   wherein said host computer includes means for calculating maintenance information according to (i) said present position information and said working environment information of said predetermined electronic device, sent from said predetermined electronic device, (ii) and a predetermined calculation table, so as to send said maintenance information to said electronic device.

14. The host computer of claim 13, wherein said maintenance information includes at least one of an inspection time and a part replace time.

15. The host computer of claim 13, wherein said host computer determines at least one of terrain and weather of a location at which said electronic device is positioned, from said present position information.

16. The host computer of claim 13, wherein said host computer judges a location, at which said electronic device is positioned, as indoor when said present position information is not detected.

17. The host computer of claim 13, wherein said predetermined calculation table includes at least one constant set corresponding to each of air temperature, humidity, density of dust, weather, terrain, and indoor/outdoor status.

18. The host computer of claim 17, wherein said host computer calculates at least one of said inspection time and said part replace time of said predetermined electronic device by multiplying a working time of said electronic device with at least one of said constants so as to obtain an adequate working time.

19. The host computer of claim 17, wherein said host computer calculates at least one of said inspection time and said part replace time of said predetermined electronic device by multiplying a number of working times of said electronic device with at least one of said constants so as to obtain an adequate number of working times.

20. An electronic device, capable of communicating with an outside apparatus through a network including a telephone line, comprising:
   a position information detection means for detecting present position information and working environment information of said electronic device,
   an information sending means for sending device kind information, present position information and working environment information of said electronic device to said outside apparatus; and
   an information receiving means for receiving maintenance information from said outside apparatus.

21. The electronic device of claim 20, further comprising:
   a display means for displaying said maintenance information received from said outside apparatus.

22. The electronic device of claim 20, wherein said electronic device comprises a position information detection means, having a GPS function, for obtaining said present position information.

23. The electronic device of claim 20, wherein said working environment information includes information regarding at least one of temperature, humidity, and density of dust of a location at which said electronic device is positioned.

24. The electronic device of claim 23, wherein said working environment information is obtained by at least one sensor provided in said electronic device.

25. The electronic device of claim 20, wherein said maintenance information includes at least one of an inspection time and a part replace time.

26. The electronic device of claim 20, wherein said electronic device is a digital still camera.

27. An electronic device, comprising:
   a memory means for storing information regarding at least one of a periodic inspection time and a part replace time for said electronic device;
   a detecting means for detecting present position information and working environment information of said electronic device; and
   a control means for controlling said electronic device so as to calculate maintenance information according to at least one of said present position information and said working environment information, with a predetermined calculation table, for at least one of said periodic inspection time and said part replace time.

28. The electronic device of claim 27, further comprising:
   a display means for displaying said maintenance information.

29. The electronic device of claim 27, wherein said electronic device comprises a position information detection means, having a GPS function, for obtaining said present position information.

30. The electronic device of claim 27, wherein said working environment information includes information regarding at least one of temperature, humidity, and density of dust of a location at which said electronic device is positioned.

31. The electronic device of claim 30, wherein said working environment information is obtained by at least one sensor provided in said electronic device.

32. The electronic device of claim 27, wherein said control means controls said electronic device to determine at least one of terrain and weather of a location, at which said electronic device is positioned, from said present position information.

33. The electronic device of claim 32, wherein said control means controls said electronic device to judge a location, at which said electronic device is positioned, as indoor when said present position information is not detected.

34. The electronic device of claim 27, wherein said predetermined calculation table includes at least one constant set corresponding to each of air temperature, humidity, density of dust, weather, terrain, and indoor/outdoor status.

35. The electronic device of claim 34, wherein said control means controls said electronic device to calculate at least one of an inspection time and a part replace time of said electronic device by multiplying a working time of said electronic device with at least one of said constants so as to obtain an adequate working time.

36. The electronic device of claim 34, wherein said control means controls said electronic device to calculate at least one of an inspection time and a part replace time of said electronic device by multiplying a number of working times of said electronic device with at least one of said constants so as to obtain an adequate number of working times.

37. The electronic device of claim 27, wherein said electronic device is a digital still camera.

* * * * *

UNITED STATES PATENT AND TRADEMARK OFFICE
CERTIFICATE OF CORRECTION

PATENT NO. : 6,895,368 B2 Page 1 of 1
DATED : May 17, 2005
INVENTOR(S) : Koichiro Murakami It is certified that error appears in the above-identified patent and that said Letters Patent is hereby corrected as shown below:

<u>Title page,</u>
Insert Item -- [30]    Foreign Application Priority Data
            December 12, 2001    (JP)…………………….. 2001-378438 --.

Signed and Sealed this

Thirteenth Day of September, 2005

JON W. DUDAS
*Director of the United States Patent and Trademark Office*